United States Patent
Cricco

(10) Patent No.: US 7,481,373 B2
(45) Date of Patent: Jan. 27, 2009

(54) TRIGGERING A PROACTIVE SESSION FROM AN APPLET IN A SMART CARD

(75) Inventor: Remy Cricco, Marseilles (FR)

(73) Assignee: Gemalto SA, Gemenos (FR)

( * ) Notice: Subject to any disclaimer, the term of this patent is extended or adjusted under 35 U.S.C. 154(b) by 149 days.

(21) Appl. No.: 11/205,188

(22) Filed: Aug. 17, 2005

(65) Prior Publication Data

US 2006/0113379 A1 Jun. 1, 2006

(30) Foreign Application Priority Data

Nov. 30, 2004 (FR) .................................. 04 12727

(51) Int. Cl.
*G06K 19/06* (2006.01)
(52) U.S. Cl. ...................... 235/492; 235/375; 235/380; 235/382
(58) Field of Classification Search ................ 235/492, 235/375, 379, 380, 382; 705/43
See application file for complete search history.

(56) References Cited

U.S. PATENT DOCUMENTS

| | | | |
|---|---|---|---|
| 6,005,942 A * | 12/1999 | Chan et al. .................... 713/187 |
| 6,016,963 A * | 1/2000 | Ezawa et al. ................. 235/492 |
| 6,488,211 B1 * | 12/2002 | Everett et al. ................ 235/492 |
| 6,694,436 B1 * | 2/2004 | Audebert ........................ 726/9 |

\* cited by examiner

*Primary Examiner*—Seung H Lee
(74) *Attorney, Agent, or Firm*—Buchanan Ingersoll & Rooney PC

(57) ABSTRACT

In a communication interface of a terminal, such as a mobile device, that includes a first application part (APT), an action is triggered from a second application part in a chip card. After a command designating the action and transmitted from the first to the second part, the first part is put to sleep. The second part is put on standby and storing parameters of the action are stored in the chip card. The second part is awakened following an event command transmitted by the communication interface, and the stored parameters are read. A command, for example for a call establishment or short message sending request, is established according to the parameters read from the second awakened part, and the established command is transmitted to the communication interface.

7 Claims, 2 Drawing Sheets

TRIGGERING A PROACTIVE SESSION FROM AN APPLET IN A SMART CARD

BACKGROUND OF THE INVENTION

The present invention concerns a distributed application in the form of a first part in a terminal and the second part in a chip card, also referred to as a microcontroller card or integrated-circuit card, connected to the terminal.

According to a preferred example to which reference will be made in the remainder of the description, the terminal is a mobile radial terminal in a digital cellular radio communication network, and the chip card is a removable user identity module of the UICC (Universal Integrated Circuit Card) type.

The invention thus relates to an open terminal in which there is implemented an open operating system that allows dynamic downloading of additional applications on top of the operating system, each distributed partly in the terminal and partly in a chip card.

A chip card of this type makes it possible to store applications and comprises a SIM (Subscriber Identity Module) or USIM main application for communicating with the outside via a communication interface in a terminal and authenticating the user of the card. Only the said main application accesses the communication interface in the terminal in a synchronised manner. Neither of the two parts of the distributed applications can access the communication interface in a synchronised manner.

Thus the first parts of the distributed applications and the communication interface, although independent and able to be executed on the operating system of the terminal, can access the chip card separately. For example, a command established by a first part of a distributed application and transmitted to the chip card can result in an action requiring a response from the chip card including a proactive command having to have recourse to the communication interface in the terminal, such as a call establishment.

However, the first application part, not being capable of interpreting the proactive command, cannot trigger a proactive session. Moreover, the communication interface, not having interrogated the chip card and therefore not originating the proactive command established, can also not interpret it, which results in a blockage.

SUMMARY OF THE INVENTION

The objective of the invention is to overcome the lack of synchronisation between the first part of a distributed application and the communication interface so that the second part of the application can deliver to the communication interface a proactive command that can be interpreted by it.

To achieve this objective, a method for triggering an action in a communication interface of a terminal including a first part of an application from a second part of the application installed in a chip card connected to the terminal, is characterised in that it comprises the following steps after a command designating the action and transmitted by the first application part to the second application part:

putting the first application part to sleep, putting the second application part on standby and storing parameters of the action designated in the chip card, awakening the second application part following an event command transmitted by the communication interface and reading the action parameters stored, and establishing a command according to the action parameters read in the awakened second application part and transmitting the established command to the communication interface.

The command thus established and transmitted to the communication interface is a proactive command that can trigger a communication with the outside of the terminal such as another terminal or a server.

Another object of the invention is a chip card connected to a terminal in order to implement the method of the invention. The chip card comprises, when after a command designating the action and transmitted by the first application part to the second application part:

a means for putting the first application part on standby, a means for awakening the second application part and storing parameters of the action designated in the chip card, a means for awakening the second application part following an event command transmitted by the communication interface and reading the action parameters stored, and a means for establishing a command according to the action parameters read in the awakened second application part and transmitting the established command to the communication interface.

The invention also relates to a computer program able to be implemented in a chip card according to the invention connected to a terminal. The program comprises code instructions that, when the program is loaded and executed on the said chip card, perform the steps according to the method of the invention.

BRIEF DESCRIPTION OF THE DRAWINGS

Other characteristics and advantages of the invention will emerge more clearly from the following description of several preferred embodiments of the invention, given by way of non-limiting examples, with reference to the corresponding accompanying drawings, in which.

DETAILED DESCRIPTION

Figure 1:
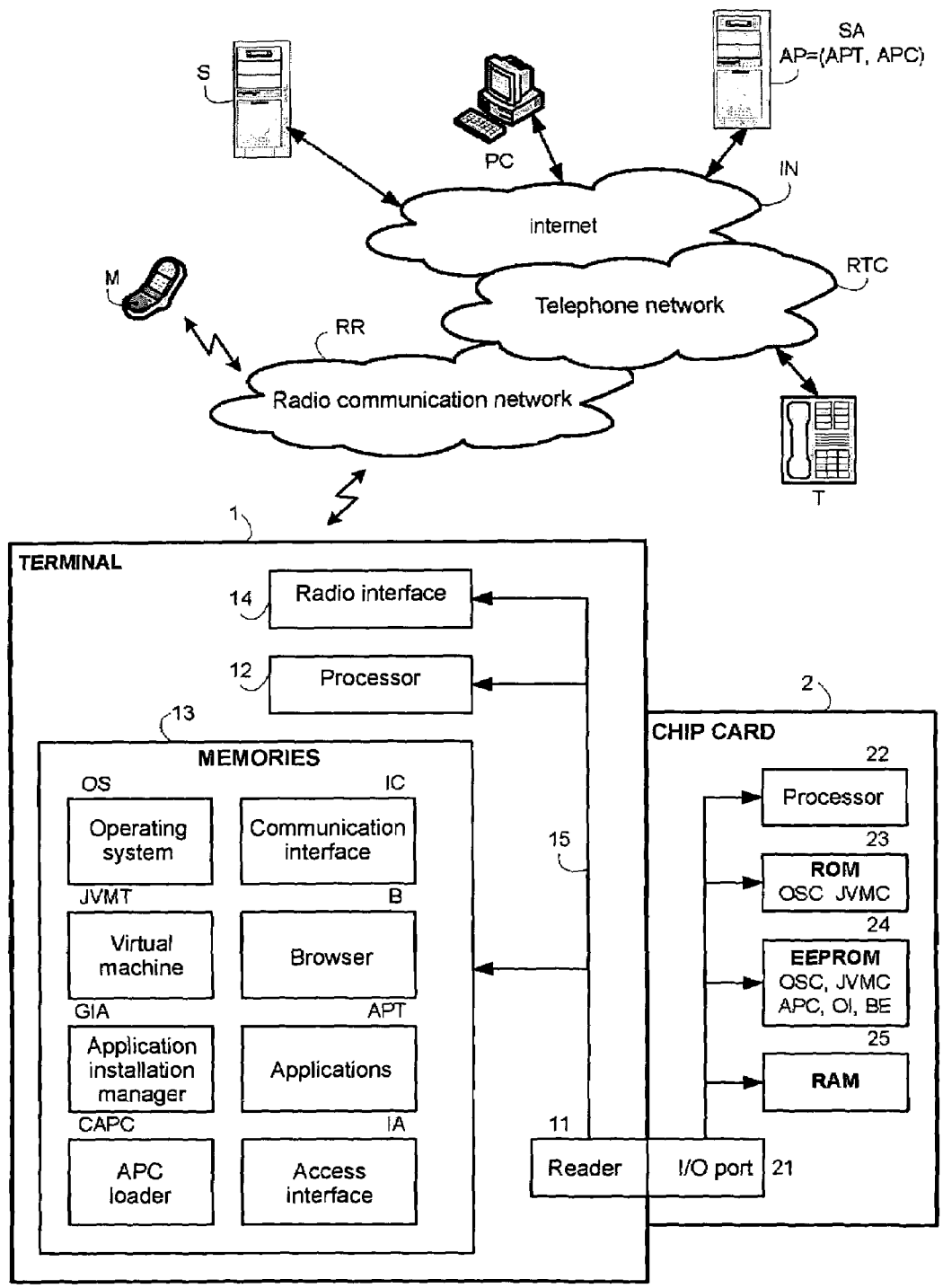
FIG. 1 is a schematic block diagram of a mobile radio terminal and a chip card including means according to a preferred embodiment implementing the invention.

In a terminal 1 of the mobile radio terminal type and a chip card 2 shown in FIG. 1, there are depicted functional blocks, the majority of which fulfill functions having a link with the invention and may correspond to software and/or hardware modules.

The mobile terminal 1 is included in a digital cellular radio communication network RR, for example of the GSM, GPRS or UMTS type, and can communicate with other terminals M, T and servers S through the network RR, a switched telephone network STN and the Internet IN for example. The chip card 2 constitutes a user identity module of the UICC (Universal Integrated Circuit Card) type removable from the mobile terminal 1. The chip card is a SIM (Subscriber Identity Module) card when the network RR is of the GSM or GPRS type. The chip card contains the USIM application when the network RR is functioning in CDMA (Code Division Multiple Access) mode according to the third generation (3GPP) of the UMTS (Universal Mobile Telecommunications System) type. In a variant, the mobile terminal 1 is a small item of equipment such as a personal digital assistant (PDA) able to communicate with networks and exchange commands and responses with a chip card.

According to other examples, the terminal is a fixed terminal such as a bank terminal accepting a debit or credit chip card or a portable message transmission device, or a personal computer (PC) provided with a chip card reader.

More generally, the chip card is a portable electronic object such as a debit or credit card, an electronic purse, an additional chip card or any other small or miniature electronic device.

In general, the terminal 1 contains, as a peripheral, a reader 1 that is connected to an input/output port 21 of the chip card 2 with or without electrical contact.

In addition to the chip card reader 11, the terminal 1 of the mobile radio telephone type comprises conventionally a processor 12, memories 13 and a radio interface 14 connected by a bus 15. The memories 13 group together various memories such as a read only memory (ROM), a EEPROM non-volatile memory and a RAM memory. When the terminal is for example a personal computer, the memories 13 comprise a hard disk. The radio interface 14 transposes in frequency, converts digitally, demodulates and decodes messages received via the fixed network in the network RR and conversely transmits messages. The terminal 1 comprises other peripherals to the user interface with the processor 12 such as a keyboard, a graphical display, a loudspeaker and/or a microphone.

The memories 13 in the terminal 1 contain in particular an operating system OS, for example of the BRW, Palm OS, SYMBIAN, Windows Mobile or Nucleus type, an execution environment such as for example a Java virtual machine JVMT and various applications and data, and may also contain a browser B. In the remainder of the description, reference will be made to a Java virtual machine.

In particular, in the non-volatile memory of the memories 13, there are implemented first parts APT of applications AP also distributed in the chip card 2, an application installation manager GIA, which may be included in the virtual machine JVMT, and a loader CAPC. The applications AP are written initially in a high-level language of the object oriented type such as the Java language compatible with the virtual machine JVMT. The first parts APT of applications AP are also called MIDlet (Mobile Information Device applet). The manager GIA programmed in Java language and executable in the terminal serves to install various applications in the memories 13 and to launch their executions, and in particular to install and launch the first part APT of each application AP. The applications AP are downloaded into the terminal and the chip card for example from an application server SA managed for example by the editor of the chip card 2 or any other editor. In connection with the manager GIA, the loader CAPC loads a second part APC of each application AP from the terminal into the chip card. The loader CAPC creates a link between the virtual machine JVMT and the manager GIA both implemented in the terminal and a Java virtual machine JVMC and a computer tool OI both implemented in the chip card 2 in order to install the second parts APC of the application AP through a predetermined communication protocol.

In a variant, the parts APT and APC of an application AP are not downloaded and were installed in the terminal 1 and chip card 2 at the time of manufacture thereof.

Typically the predetermined communication protocol is a half-duplex asynchronous protocol having protocol data units (APDU) consisting of commands COM transmitted from the terminal 1 to the chip card 2 and replies REP from the chip card 2 to the terminal 1. According to this protocol, sometimes referred to as SIM application toolkit according to the standard 3GPP TS 51.04 or ETSI 102.223, the commands are always triggered at the initiative of the terminal and the chip card is proactive in order to initiate actions but still under the control of the terminal.

So that the first parts APT of the applications AP communicate respectively with the second part APC of the applications AP in accordance with the predetermined communication protocol, an access interface IA for accessing the resources and data in the chip card is implemented in the memories 13 for example in the form of a Java API (application programming interface) program in accordance with the specification JSR 117 in the case of a J2ME terminal supporting Java technology.

The memories 13 also comprise a communication interface IC also referred to as a SIM toolkit driver, so that the main SIM or USIM application or any other application in the chip card 2 communicates with the "outside world" via the terminal 1, for example with a server S or a terminal M, T connected to the Internet IN. The communication interface IC manages commands and replies exchanged between the "outside world" and the main application SIM or USIM for example in order to adapt them to short messages exchanged with a short message server of the network RR and bundling data transmitted and received by the server S or the terminal M through the Internet IN. The chip card 2 conventionally comprises, in integrated form, a microprocessor 22, a non-rewritable memory 23 of the ROM, a non-volatile memory 23 of the EEPROM type and a memory 25 of the RAM type intended essentially to exchange data with the terminal 1 through the input/output port 21 and the reader 11. The memories 23 and 24 contain the codes and data for example for an operating system OSC and of the virtual machine JVMC according to the Java card specification, or any other proprietary operating system. The non-volatile memory 24 contains applications, such as the SIM or USIM application initially installed at the time of manufacture of the card and the installation tool OI. The memory 24 also comprises a memory space for storing the second parts APC of the distributed applications AP transmitted by the server SA to the terminal 1 and downloaded by the loader CAPC cooperating with the installation tool OI through the reader 11, the port 21 and the RAM memory 25. The second application parts APC constitute STK (SIM toolkit) applets.

Figure 2:
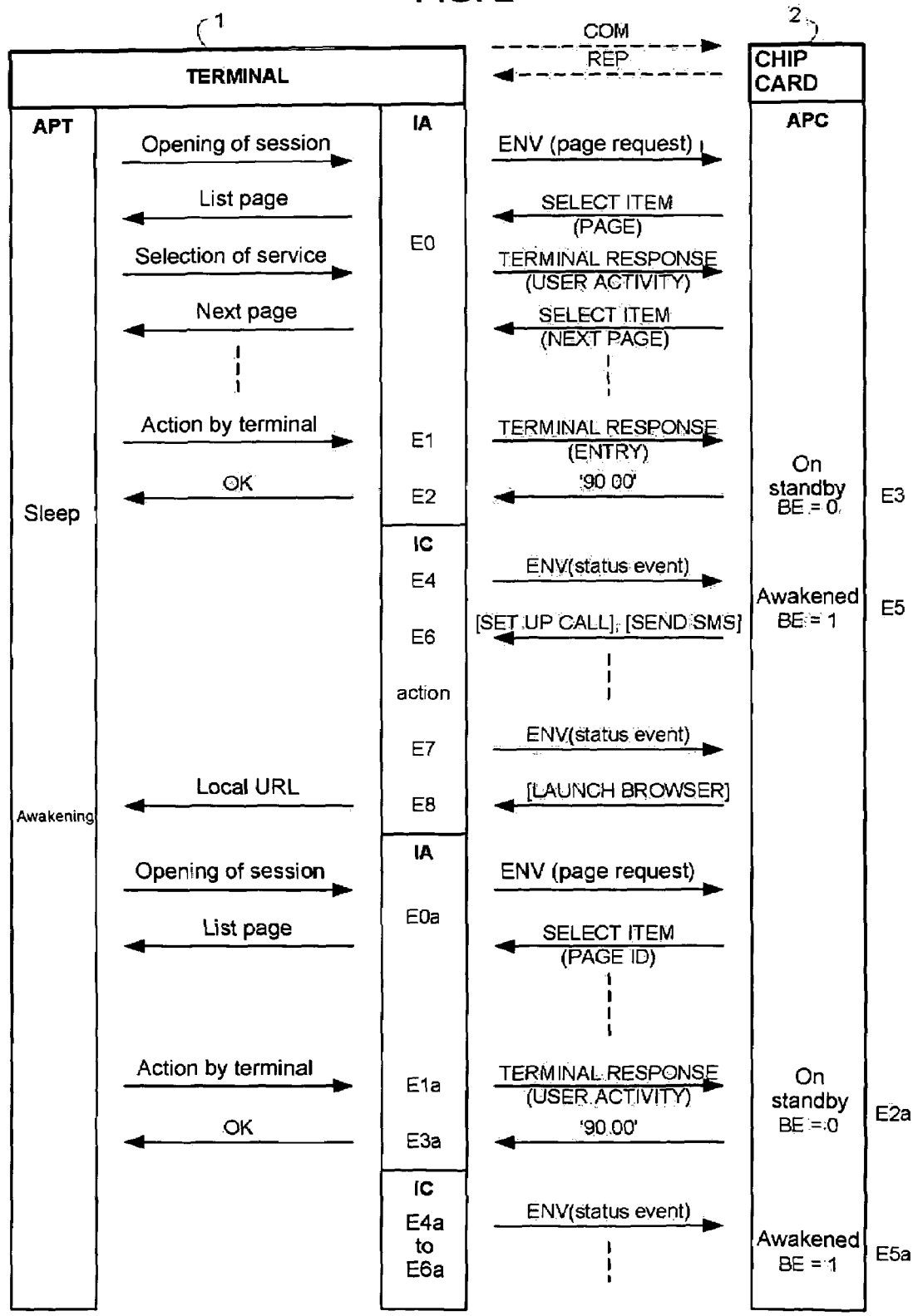
FIG. 2 is an algorithm of the method for triggering an action in a communication interface of the terminal from a second application part, according to the invention.

With reference now to the top part of FIG. 2 relating to a session for example of the SAT (SIM application toolkit) type, a few exchanges of commands COM transmitted by the terminal 1 to the chip card 2 and replies REP transmitted by the chip card 2 to the terminal 1 according to the predetermined communication protocol that requires that each command and response pair be triggered at the initiative of the terminal since the card, although proactive, is the slave of the terminal, are given.

At steps E0, at the start of the session between first part APT and second part APC of an application AP, the first application part requires a session opening at the access interface IA which establishes a command envelope ENV in order to transfer the designation of the action in the second application part APC, in this case an action in order to obtain (SELECT ITEM) a page. The application part APC in the card 2 returns for example a list of services each designated by a name and/or an icon, compressed in the data field of a response REP to the access interface IA so that the application part APT supplies a page of names and/or icons corresponding to the services and demands the display of this page on the screen of the terminal 1. Then the user of the terminal selects the name or icon of a service and navigates in a corresponding sub-menu so that, by means of command ENV and response REP pairs, the first application part APT transmits selections in pages and the second application part APC transmits pages to be displayed.

At this stage, as already indicated with regard to the prior art in the preamble of the description and as shown at a step E1 in FIG. 2, a selection by the user can lead to an action (TERMINAL RESPONSE) requiring a response including a proactive command. The action can in particular relate to a communication with an entity M, T, S external to the terminal 1, which uses the communication interface IC. The action corresponds to a proactive command relating for example to a call establishment demand (SET UP CALL) or a demand to send a short message (SEND SHORT MESSAGE) established by the second application part APC and intended for the communication interface IC in the terminal 1. The proactive command cannot be interpreted by the first application part APT, which cannot manage any proactive session. In addition, the communication interface IC will remain inactive since it has not interrogated (FETCH) the chip card for this proactive command.

According to the invention, the lack of synchronisation between the first application part APT (MIDlet) and the communication interface IC is surmounted by virtue of steps E2 to E6 following on from step E1 and shown in FIG. 2.

After step E1, the second application part APC does not respond with a proactive command, but the application part APC is recorded dynamically in an event table included in the card in order to be woken-up when the status event appears. The application part APC then switches to a standby state after having indicated it by a response RPE 'Ox 90 00' without data to the first application part APT, which thus momentarily ends communication with the second application part APC and goes to sleep, at step E2. The standby state at step E3 generates in the chip card 2 a transfer of parameters of the action designated by the first application part APT at step E1 in order to write them in an event space of the memory 24, and the setting of a state bit BE to a first logic "0" state in the card 2.

During steps E0 to E2, the communication interface IC continues to periodically interrogate the chip card 2. Thus, following the response REP 'Ox 90 00', a next event command ENV (status event) is transmitted at step E4 by the communication interface IC to the second application part APC and interrogates the chip card on the intention of the latter to send a proactive command. In the chip card, the second application part APC at the standby state BE="0" is listening out for any event demand and is woken-up by an event command 'status event', at step E5. The application part APC reads the parameters of the action designated by the application part APT at step E1, in the event space of the memory 24 of the chip card. The state bit BE is set to a second logic "1" state so that the application part APT thus woken-up establishes a response REP with the proactive command corresponding to the parameters read of the designated action, such as for example a call establishment demand (set up call) or a short message sending demand (send SMS). The application part APC dynamically deletes its registration relating to the status event in the table of events, except if it must execute other commands, as illustrated by the following steps E0a. At step E6, the proactive command in the response REP is established according to the parameters of the action read in the memory 24 and transmitted by the woken-up application part APT to the communication interface IC of the terminal 1. The interface IC then processes the proactive command in a conventional manner, requiring the establishment of a call from the fixed network of the network RR or transmitting a short message to the short message server, according to the aforementioned two examples.

In a variant of step E1, the second application part APC is activated by an event external or internal to the terminal but independent of the first application part APT so that the second part APC responds following step E8, for example by initiating a browser.

If the first application part APT must continue a command establishment execution after the response REP 'Ox 90 00' without data of this second application part APC, the application part APT goes to sleep, simulating an occupation at step E2, until it receives a particular proactive command of the "push" type, which will push it to waken up, after steps E4 to E6.

As shown at the bottom of FIG. 2, the particular proactive command is for example a browser launch command LAUNCH BROWSER that is established and transmitted by the second application part APC at a step E8 following on from a step E8 and that contains data and a local URL address (uniform resource locator) when interpreting the data in order to launch the browser B in the terminal 2. During step E7, the communication interface IC has transmitted a previous event command 'status event' to the second application part APC, after the steps E4 to E6 and the execution of the action designated in the communication interface IC, preceding steps E7 and E8.

The particular proactive command (LAUNCH BROWSER) creates a dynamic between the application parts APT and APC in the direction of the second application part APC towards the first application part APT. The interaction between the application parts APT and APC is continued following a step E8 by conventional exchanges of commands and responses E0a similar to steps E0 and able to be followed by steps E1a to E6a according to the invention, as shown at the bottom of FIG. 2.

The invention claimed is:

1. A method for triggering an action in a communication interface of a terminal including a first part of an application, from a second part of the application installed in a chip card connected to the terminal, comprising the following steps after a command designating the action and transmitted by the first application part to the second application part:
   putting the first application part to sleep,
   putting the second application part on standby and storing parameters of the designated action in the chip card,
   awakening the second application part following an event command transmitted by the communication interface and reading the action parameters stored, and
   establishing a command according to the action parameters read in the awakened second application part and transmitting the established command to the communication interface.

2. A method according to claim 1, wherein the designated action relates to a communication with an entity external to the terminal.

3. A method according to claim 2, comprising, after execution of the action designated in the communication interface and transmission of an event command from the communication interface to the second application part, the step of transmitting a particular command from the second application part to the first application part in order to awaken the first application part.

4. A method according to claim 1, comprising, after execution of the action designated in the communication interface and transmission of an event command from the communication interface to the second application part, the step of transmitting a particular command from the second application part to the first application part in order to awaken the first application part.

5. A method according to claim 4, wherein the particular command launches a browser in the terminal.

6. A chip card connected to a terminal in order to trigger an action in a communication interface of the terminal including a first part of an application, by means of a second part of the application installed in the chip card, comprising:
- a means for putting the first application part to sleep after a command designating the action is transmitted by the first application part to the second application part,
- a means (E3) for putting the second application part on standby and storing parameters of the action designated in the chip card,
- a means for awakening the second application part following an event command transmitted by the communication interface and reading the action parameters stored, and
- a means for establishing a command according to the action parameters read in the awakened second application part and transmitting the established command to the communication interface.

7. A computer program able to be implemented in a chip card connected to a terminal, for triggering an action in a communication interface of the terminal including a first part of an application, from a second part of the application installed in the chip card, comprising program instructions that, when the program is loaded and executed on said chip card, perform the following steps after a command designating the action and transmitted by the first application part to the second application part:
- putting the first application part to sleep,
- putting the second application part on standby and storing parameters of the action designated in the chip card,
- awakening the second application part following an event command transmitted by the communication interface and reading the action parameters stored, and
- establishing a command according to the action parameters read in the awakened second application part and transmitting the established command to the communication interface.

* * * * *